(12) United States Patent
Andersson et al.

(10) Patent No.: US 11,017,079 B2
(45) Date of Patent: May 25, 2021

(54) IDENTIFYING MALICIOUS ACTIVITY USING DATA COMPLEXITY ANOMALIES

(71) Applicant: Trend Micro Incorporated, Tokyo (JP)

(72) Inventors: Jonathan Edward Andersson, Austin, TX (US); Josiah Dede Hagen, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 238 days.

(21) Appl. No.: 15/988,955

(22) Filed: May 24, 2018

(65) Prior Publication Data

US 2018/0268137 A1 Sep. 20, 2018

Related U.S. Application Data

(63) Continuation of application No. PCT/US2015/067222, filed on Dec. 21, 2015.

(51) Int. Cl.
| | |
|---|---|
| *G06F 21/55* | (2013.01) |
| *G06F 21/56* | (2013.01) |
| *H04L 29/06* | (2006.01) |
| *G06F 21/57* | (2013.01) |

(52) U.S. Cl.
CPC .......... *G06F 21/554* (2013.01); *G06F 21/563* (2013.01); *G06F 21/577* (2013.01); *H04L 63/0245* (2013.01); *H04L 63/1425* (2013.01); *G06F 2221/034* (2013.01)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS

| | | | | |
|---|---|---|---|---|
| 8,010,685 | B2 * | 8/2011 | Singh | H04L 63/145 709/229 |
| 8,078,556 | B2 * | 12/2011 | Adi | G06N 5/025 706/16 |
| 8,489,931 | B2 * | 7/2013 | Keromytis | G06N 7/005 714/38.1 |
| 9,516,053 | B1 * | 12/2016 | Muddu | H04L 63/1416 |
| 2010/0064368 | A1 * | 3/2010 | Stolfo | H04L 63/1416 726/24 |
| 2012/0278477 | A1 * | 11/2012 | Terrell | H04L 41/5009 709/224 |
| 2013/0346596 | A1 * | 12/2013 | Balakrishnan | H04L 63/1425 709/224 |

* cited by examiner

*Primary Examiner* — Sharif E Ullah
(74) *Attorney, Agent, or Firm* — Okamoto & Benedicto LLP (57) ABSTRACT

Examples relate to identifying malicious activity using data complexity anomalies. In one example, a computing device may: receive a byte stream that includes a plurality of bytes; determine, for a least one subset of the byte stream, a measure of complexity of the subset; determine that the measure of complexity meets a predetermined threshold measure of complexity for a context associated with the byte stream; and in response to determining that the measure of complexity meets the threshold, provide an indication that the byte stream complexity is anomalous.

5 Claims, 5 Drawing Sheets

IDENTIFYING MALICIOUS ACTIVITY USING DATA COMPLEXITY ANOMALIES

CROSS-REFERENCE TO RELATED APPLICATION

This application is a continuation of International Application No. PCT/US2015/067222, with an International Filing Date of Dec. 21, 2015, which is incorporated herein by reference in its entirety.

BACKGROUND

Computer networks and the devices that operate on them often experience problems for a variety of reasons, e.g., due to misconfiguration, software bugs, and malicious network and computing device attacks. Detecting and preventing the use and spread of malicious software, for example, is often a priority for computer network administrators. Malicious software is increasingly designed to avoid detection using increasingly sophisticated methods.

BRIEF DESCRIPTION OF THE DRAWINGS

The following detailed description references the drawings, wherein.

DETAILED DESCRIPTION

Anomalies in the expected complexity for streams of data, such as byte streams being processed by a computer and/or transmitted across a network, may be indicative of potentially malicious data. For example, malicious files often attempt to hide malicious code within more traditional code, e.g., using obfuscation. Obfuscated portions of code are one example type of data that is more likely to be complex than un-obfuscated portions of code. An expected measure of complexity may be determined for byte streams in a particular context, and the complexity of unknown byte streams may be compared to the expected measure of complexity to determine whether an anomaly exists.

One way to measure the complexity of data is by using compressibility. Relatively simple portions of data may be compressed more easily, e.g., to a smaller size, than more complex portions of data from the same data stream. For example, many compression algorithms compress data by taking advantage of repeated data or patterns, which may occur often in certain contexts, such as computer files or network packet fields. Another way to measure complexity of data is using entropy, where data having high entropy is more likely to be complex than data having low entropy.

By way of example, a distribution of compressibility values, e.g., compression ratios, for benign computer files may be gathered to create a threshold compressibility value, e.g., in standard deviations from the mean compression ratio. Unknown computer files may be compressed and the compression ratios may be compared to the threshold compressibility value to determine whether an anomaly occurs. Computer files with anomalous complexity, or compressibility, values may trigger a variety of responses, such as a security event notification or preventing transmission of the anomalous computer file. Further details regarding the identification of anomalous data complexity are described in the paragraphs that follow.

Figure 1:
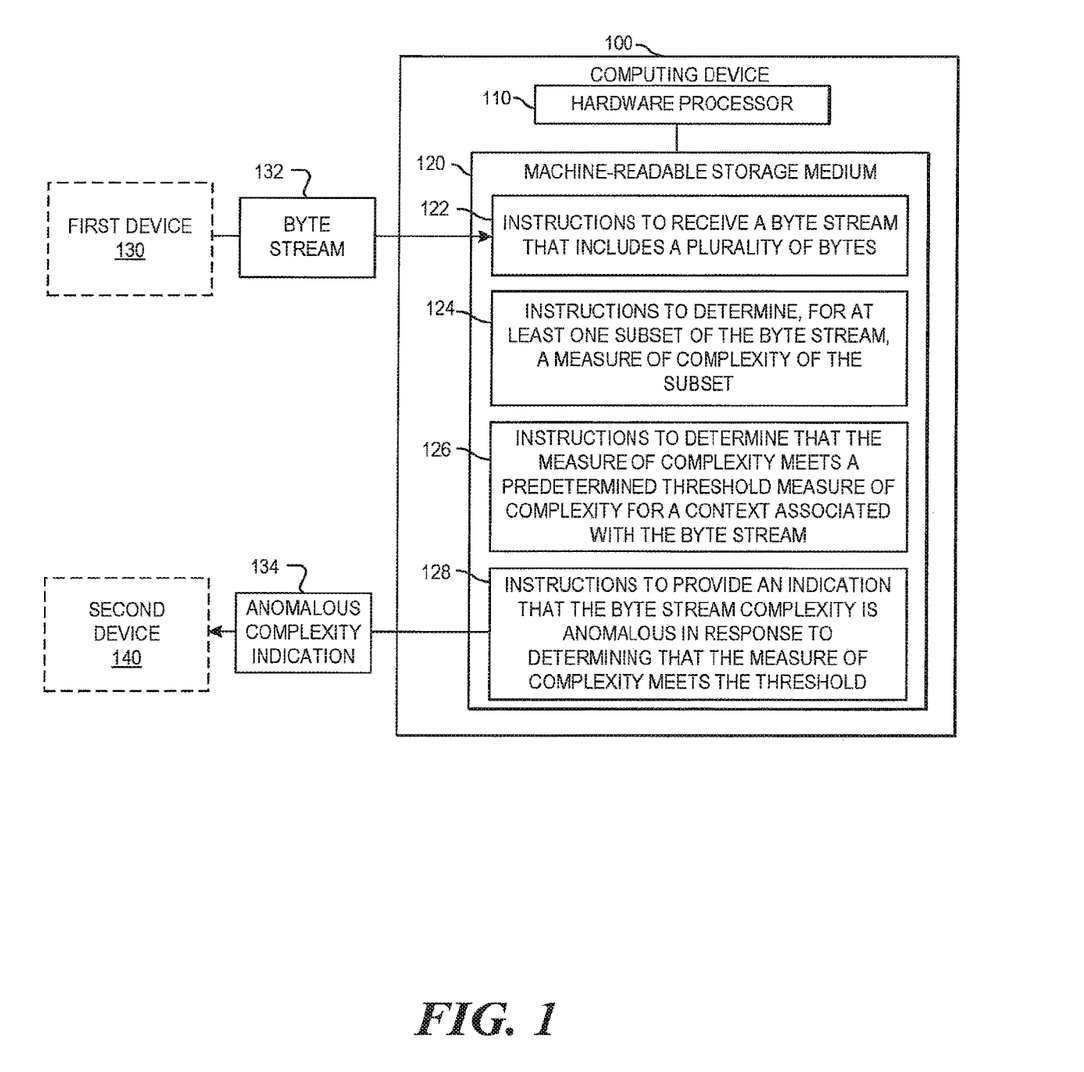
FIG. 1 is a block diagram of an example computing device for identifying malicious activity using data complexity anomalies.

Referring now to the drawings, FIG. 1 is a block diagram of an example computing device 100 for identifying malicious activity using data complexity anomalies. Computing device 100 may be, for example, a server computer, a personal computer, an intermediary network device, a mobile computing device, or any other electronic device suitable for processing data. In the embodiment of FIG. 1, computing device 100 includes hardware processor 110 and machine-readable storage medium 120.

Hardware processor 110 may be one or more central processing units (CPUs), semiconductor-based microprocessors, FPGA, and/or other hardware devices suitable for retrieval and execution of instructions stored in machine-readable storage medium 120. Hardware processor 110 may fetch, decode, and execute instructions, such as 122-128, to control the process for identifying anomalous data complexity. As an alternative or in addition to retrieving and executing instructions, hardware processor 110 may include one or more electronic circuits that include electronic components for performing the functionality of one or more instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-128, for identifying anomalous data complexity.

As shown in FIG. 1, the computing device 100 executes instructions 122 to receive a byte stream 132 that includes a plurality of bytes. FIG. 1 depicts the byte stream 132 being provided by a first source device 130, which may be any device capable of communicating data signatures to the computing device 100, such as a data storage device, separate computing device, or user input device. The actual data included in the byte stream 132 may vary depending on the context. For example, the byte stream 132 may be a computer file, a network packet, a stream of network packets, or content included in a portion of a network packet.

The computing device 100 executes instructions 124 to determine, for at least one subset of the byte stream 132, a measure of complexity of the at least one subset. In some implementations, the subset includes the whole byte stream 132. For example, the computing device 100 may determine a measure of complexity for all data included in the byte stream 132. In some implementations, the computing device 100 may determine complexity for multiple proper subsets of the byte stream 132. For example, in the context of a network packet, the computing device may determine complexity for different portions of the network packet, such as the body, header, footer, and/or source device address. The computing device 100 may, in some situations, use predetermined specifications to determine which subset(s) to determine measures of complexity for, e.g., based on the context of the byte stream 132. For example, the network packet context may trigger the example complexity determinations above, e.g., for predetermined portions of the network packet.

In some implementations, measures of complexity are based on a measure of compressibility. For example, the computing device 100 may execute instructions to compress the subset(s) of the byte stream 132 to obtain a compression ratio. When compressing subset(s) of the byte stream 132, subsets have a pre-compression size, e.g., 1,000 bytes, and a post-compression size and compression ratio that depends upon the bytes included in the subset(s) and the compression algorithm(s) used. The type of compression, e.g., compression algorithm used, may vary. By way of example, the computing device 100 may use zlib compression to compress subset(s) of the byte stream 132. Other compression algorithms may also be used, for example, bz2, Lempel-Ziv-Markov chain (lzma), and Lempel-Ziv-Welch (lzw).

The computing device 100 executes instructions 126 to determine that the measure of complexity meets a predetermined threshold measure of complexity for a context associated with the byte stream. The predetermined threshold measure of complexity may be based on a variety of things. In some implementations, the threshold measure of complexity is based on previously measured complexity values for at least one other byte stream. For example, the threshold may be based on previously measured compression ratios for byte streams that were previously identified as benign, such as benign computer files or network packets. In some implementations, the threshold measure of complexity may be determined based on a predetermined byte stream specification for a context associated with the byte stream. For example, particular network packet fields may have an expected measure of complexity that may be specified in a specification for those corresponding network packet fields. Thresholds may be determined in other ways as well, e.g., by analyzing network protocol or data element descriptions of particular types of data.

The context associated with the byte stream may be determined in a variety of ways and, in some implementations, multiple contexts may be associated with a single byte stream. The context may be a type of byte stream and/or type of information included in the byte stream. For example, a network packet may be included in the network packet context, while an executable file may be in the executable file context. A network packet may also include subsets, or portions, that have their own context. For example, the body of a network packet may be one context, e.g., the network packet body context, while HTML code included in the body of a network packet may be another context that includes the same data, e.g., the HTML context. The HTML context may also be found in other types of data streams, such as executable files that include HTML code. Expected complexity values may vary in different contexts, and complexity thresholds may also be determined and used within their corresponding context(s). As noted above, the subset of the byte stream selected by the computing device 100 may also be selected based on its context.

The type of threshold used may vary, e.g., depending on the context, a predetermined specification, or previously measured complexity values. For example, in some implementations the threshold is a distribution threshold, where prior analysis of benign byte streams results in an expected range of complexity, or compressibility, and the threshold is a number of standard deviations above the mean threshold. Other methods for determining thresholds and whether a byte stream meets the threshold also include using, for example, using local outlier factors and density based clustering. Thresholds may have upper and/or lower bounds. For example, data that is less complex than expected may indicate malicious activity, e.g., in a situation where malicious activity includes "fuzzing" data, which may be performed by users attempting to determine boundaries of parsing in various contexts and fields. As used herein, meeting a threshold includes meeting or exceeding an upper and/or a lower threshold.

In some implementations, threshold(s) and byte stream 132 subset(s) may be used and/or selected based on context. For example, when processing network packets, the computing device 100 may specifically pull the body of a network packet as one subset for threshold complexity comparison. The threshold(s) used may also depend upon the context, e.g., in the network packet context, the measure of complexity determined for the body of a network packet may be compared to a threshold that was calculated using the bodies of benign network packets, while the measure of complexity determined for the header of a network packet may be compared to a threshold that was calculated using benign network packet headers.

The computing device 100 executes instructions 128 to provide an indication 134 that the byte stream 132 complexity is anomalous in response to determining that the measure of complexity meets the threshold. The example computing device 100 provides the indication to a second device 140, which may be any device suitable for receiving communications from the computing device 100, such as another computing device, a storage device—e.g., for logging, or a security event handler.

Figure 2A:
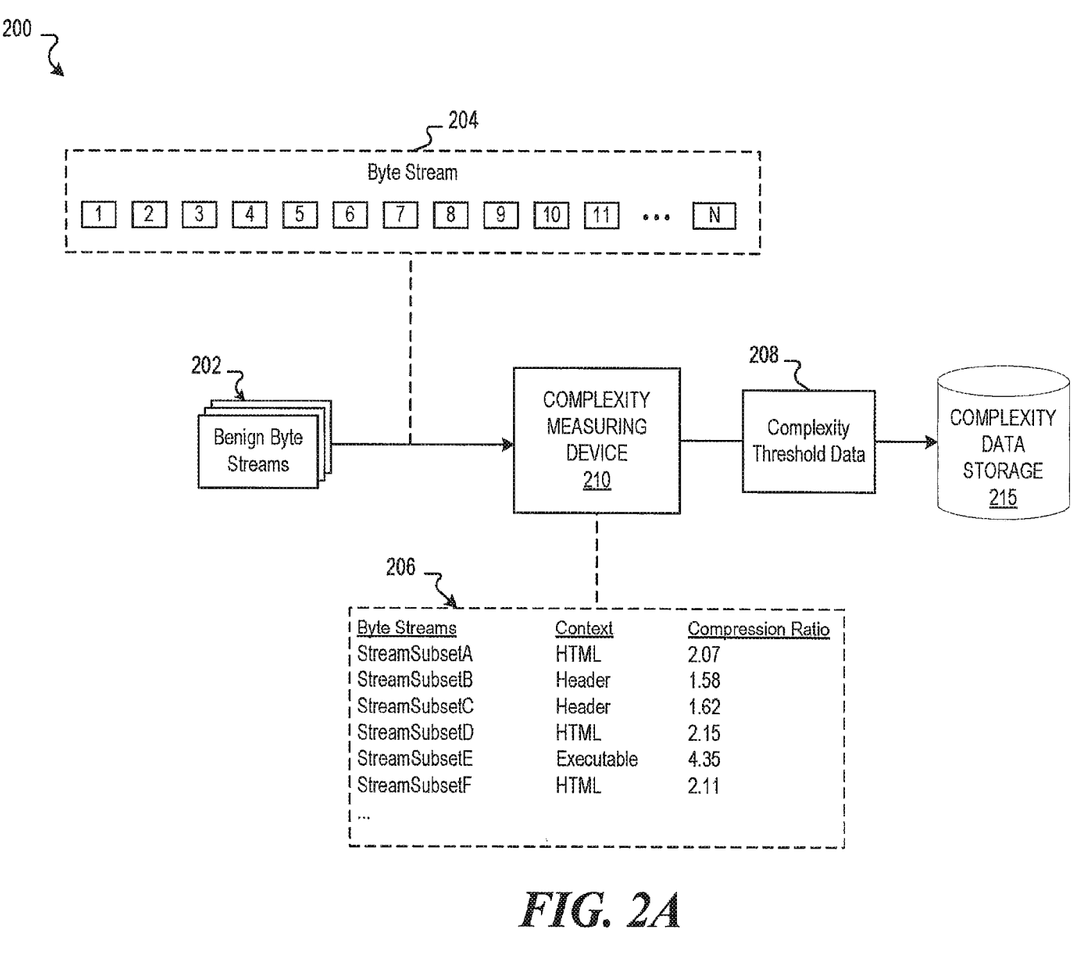
FIG. 2A is an example data flow for identifying thresholds for data complexity.
Figure 2B:
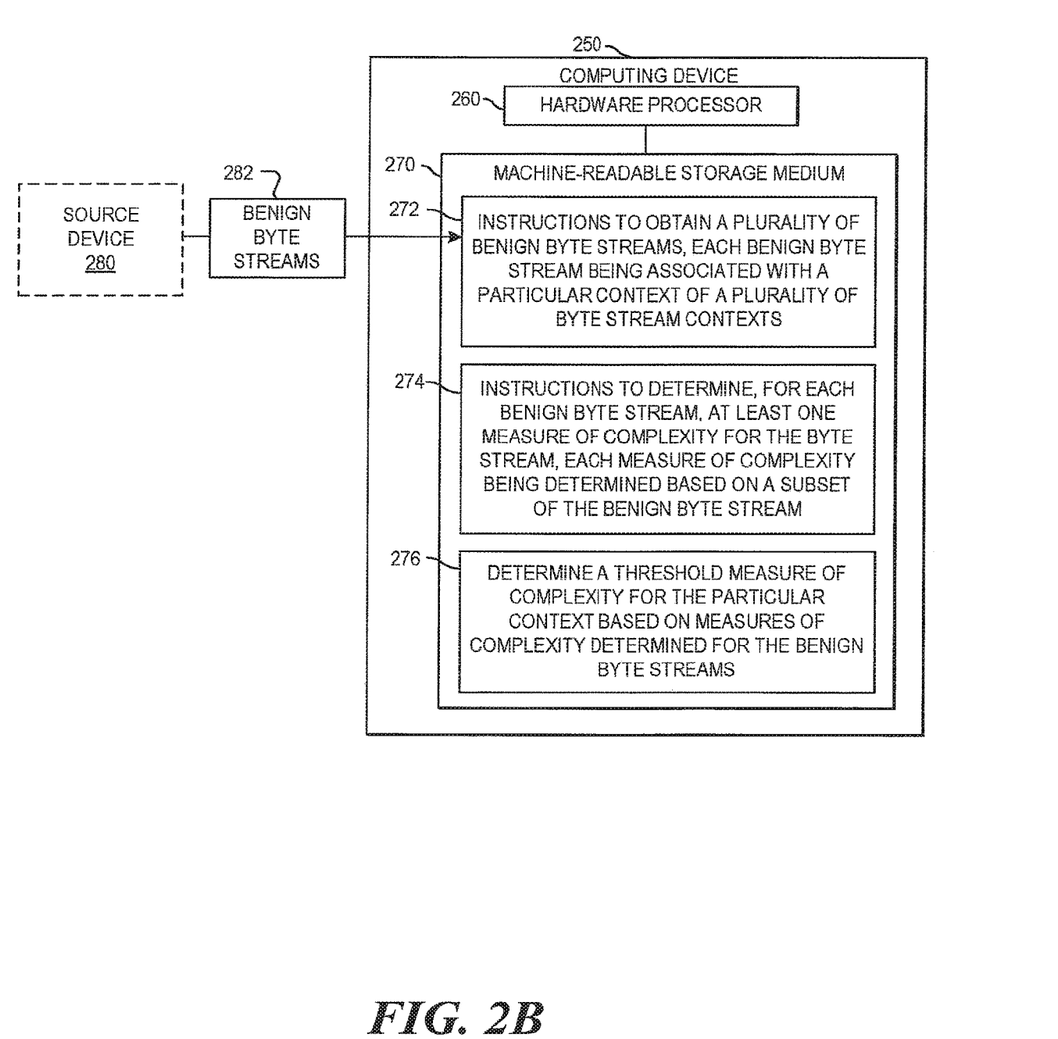
FIG. 2B is a block diagram of an example computing device for identifying thresholds for data complexity.

FIG. 2A is an example data flow 200 for identifying thresholds for data complexity. FIG. 2B is a block diagram of an example computing device 250 for identifying thresholds for data complexity. The computing device 250, hardware processor 260, machine-readable storage medium 270, and source device 280 may be the same as or similar to the computing device 100, hardware processor 110, machine-readable storage medium 120, and source device 130 of FIG. 1.

The data flow 200 depicts the determination of threshold measures of complexity for byte streams in a variety of contexts using a complexity measuring device 210, which may be implemented by a computing device, such as the computing device 100 described above with respect to FIG. 1 or the computing device 250 of FIG. 2B. The example data set, byte stream 202, may be provided by any input device, such as a separate computing device or user input.

As shown in FIG. 2B, the computing device 250 executes instructions 272 to obtain a plurality of benign byte streams, each benign byte stream being associated with a particular context of a plurality of byte stream contexts. In the example data flow 200, benign byte streams 202 are provided to the complexity measuring device 210. The each benign byte stream 202 may include, for example, a stream of bytes as indicated in the example byte stream 204, which includes an unspecified number of bytes from 1-N. Benign byte streams 202 may be, for example, network packets that are previously identified as benign, or likely to be benign.

As noted above, the context associated with a benign byte stream may, in some situations, involve more than one feature of the byte stream. For example, computer files may have general computer file context, while different types of files have their own more specific context as well, e.g., an executable computer file may be in both the computer file context and the executable computer file context, and the language the executable file is written in may also have its own context.

The computing device 250 of FIG. 2B executes instructions 274 to determine, for each benign byte stream, at least one measure of complexity for the byte stream, each measure of complexity being determined based on a subset of the benign byte stream. In the example data flow 200, complexity for subsets of the benign byte streams 202 is determined using compressibility. Each of the byte stream subsets 206 is compressed to obtain a compression ratio that is a ratio of the pre-compression size of the subset to the post-compression size of the subset. Each of the subsets 206 also has an associated context indicating which portion of the benign byte stream the subset includes and/or what type of data is included in the subset.

For example, StreamSubsetA includes HTML code that was compressed to a ratio of 2.07, StreamSubsetB includes network packet header information that was compressed to a ratio of 1.58, StreamSubsetC includes network packet header information that was compressed to a ratio of 1.62, StreamSubsetD includes HTML code that was compressed to a ratio of 2.15, StreamSubsetE includes executable code, such as javascript, that was compressed to a ratio of 4.35, StreamSubsetF includes HTML code that was compressed to a ratio of 2.11. As noted above, complexity values may be determined for a variety of subsets and for a variety of contexts.

The computing device 250 of FIG. 2B executes instructions 276 to determine a threshold measure of complexity for the particular context based on measures of complexity determined for the benign byte streams. The determination may be made in a variety of ways. In the example data flow 200, the complexity measuring device 210 may determine thresholds for one or more byte stream contexts. For example, the byte stream subsets that include HTML code have an average compressibility of 2.11, so those values may be used to create a threshold, e.g., the threshold for HTML code may be two standard deviations away from the distribution of HTML compression ratios observed for the benign byte streams 202. As noted above, other methods for determining thresholds using complexity values, including density based clustering and local outlier methods, may be used.

In the example data flow 200, the complexity threshold data 208, e.g., the data specifying threshold information for various contexts, is stored in complexity data storage 215. This information may be used, for example, by an intrusion prevention device or other data analyzing device to determine whether unknown byte streams have anomalous complexity values.

New benign byte streams may be periodically added to a system that implements the process for identifying thresholds for data complexity described above. In this situation, thresholds may be updated and adjusted, if necessary, as new complexity values are acquired.

In some implementations, the computing device 250 of FIG. 2B may execute instructions to receive a new byte stream, e.g., one for which the computing device 250 will determine whether the complexity threshold is met. In this situation, the computing device 250 may execute instructions to determine that the new byte stream is associated with the particular context for which the threshold was determined. For example, the new byte stream may be determined to be in the HTML context.

In situations where the computing device 250 determines the a measure of complexity for the new byte stream meets the threshold measure of complexity for the particular context, the computing device 250 may provide an indication the that new byte stream includes data having anomalous complexity in response to the determination that the new measure of complexity meets the threshold. For example, when using the compression threshold for HTML content, the computing device 250 may send an anomalous complexity notification in response to determining that the compressed HTML code of the new byte stream meets the threshold for the HTML context. The notification may be sent, for example, to a device for logging, an administrator device, and/or to a security event handler.

In situations where the computing device 250 determines that a measure of complexity for the new byte stream does not meet the threshold measure of complexity for the particular context, the computing device 250 may provide an indication that the new byte stream is benign in response to the determination. For example, in a context where the computing device 250 is analyzing executable computer files, determining that a compressed executable file meets a predetermined threshold for executable code may result in a notification being provided, e.g., to a log file or device, that the corresponding executable computer file is benign.

While the example above, described with respect to FIGS. 2A and 2B, determines complexity thresholds based on previously measured values of complexity, complexity thresholds may be determined in other ways. For example, complexity thresholds may be based on byte stream specifications that are predetermined for a particular context or based on user input.

Figure 3:
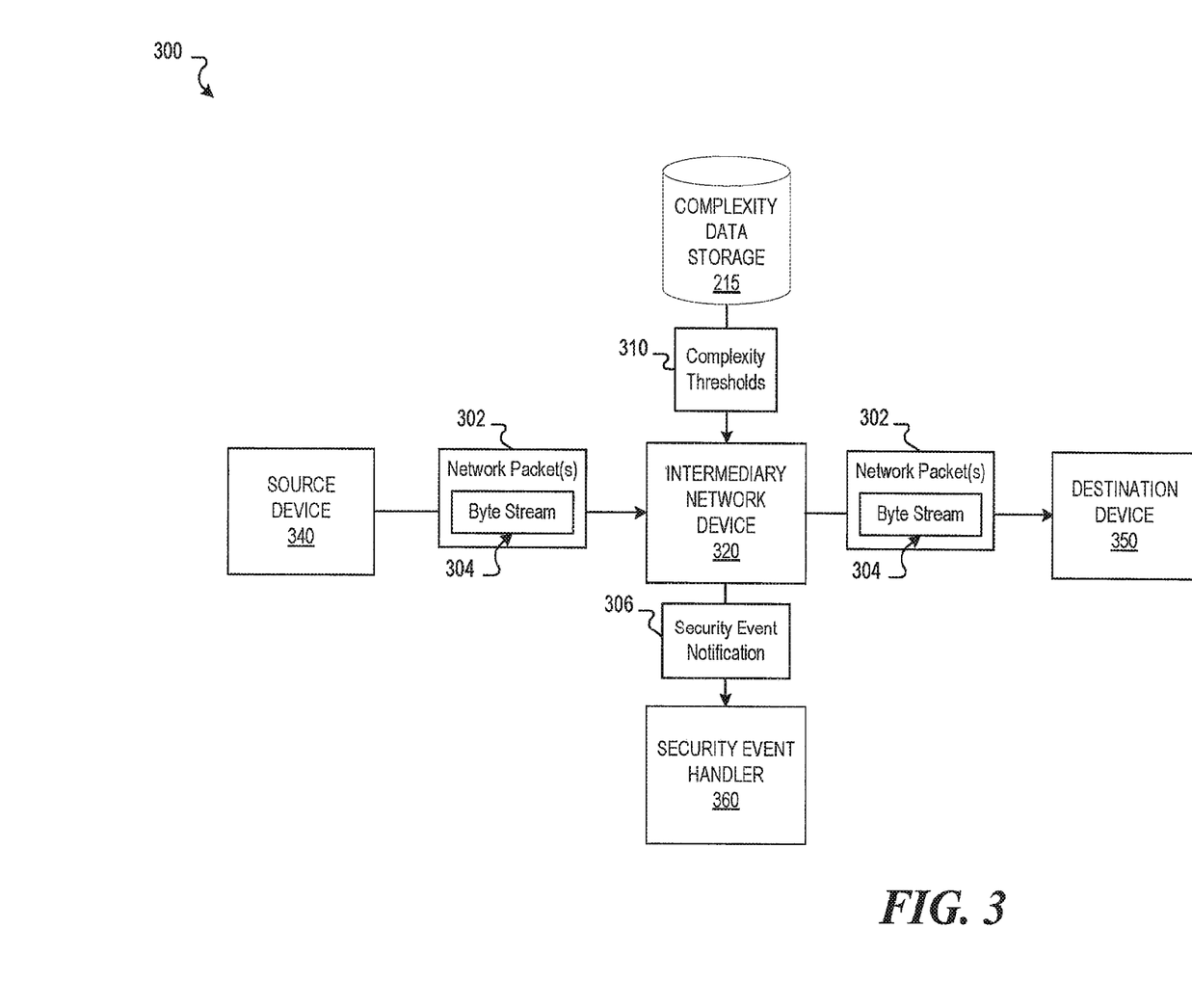
FIG. 3 is an example data flow for identifying byte streams having anomalous complexity values.

FIG. 3 is an example data flow 300 for identifying byte streams having anomalous complexity values. The uses for complexity thresholds determined for various byte stream contexts may vary and may depend upon the contexts of the byte streams. In the example data flow 300, complexity thresholds 310 determined using the methods described above are used to identify potentially malicious byte streams based on the complexity of the data included in the byte streams.

The example data flow 300 includes an intermediary network device 320, which may be any device capable of using the complexity thresholds 310 to identify potentially malicious byte streams. Examples include, for example, software defined network elements, server computers, personal computers, or network switches. The example intermediary network device 320 may be, for example, a software defined network element that includes programmable hardware, such as an FPGA, and is configured to operate as a network switch.

In this example use case, the intermediary network device 320 receives, from a source device 340, one or more network packets 302 which include a byte stream 304. The source device 340 may be any device capable of network communications, e.g., a network router or switch, a server computer, or a personal computer. In some situations, the byte stream 304 may be span multiple network packets 302 and may, in some implementations, include the data comprising the network packets 302. Examples include files split across multiple network packets and code included in particular portion of a single network packet or spread across multiple network packets in a particular portion of each network packet.

The intermediary network device 320 uses the complexity thresholds 310 to determine whether the byte stream 304 has a complexity value that meets a threshold and, as such, is potentially malicious. For example, the byte stream 304 may include javascript, and the intermediary network device 320 may compress the javascript to obtain a compression ratio for the javascript. The intermediary network device 320 may then compare the obtained compression ratio to a threshold compression ratio for javascript included in the complexity thresholds 310 obtained from the complexity data storage 215.

In a situation where the complexity of the javascipt is within expected measures, e.g., the compressed javascript does not meet/exceed a threshold compression ratio, the network packet(s) 302 and included byte stream 304 may be processed normally, e.g., by forwarding the network packet(s) 302 to their intended destination, e.g., destination device 350.

In situations where a threshold measure of complexity is met, the intermediary network device 310 may perform a variety of actions, e.g., depending upon its configuration. In the example data flow 300, the intermediary network device 320 is configured to send a security event notification 306 to a security event handler 360. The notification 306 may include a variety of information, such as the identified byte stream 304, the network packet(s) 302 that include the byte stream 304, an identifier of the context, and/or information related to the source device 340. Other example actions taken by the intermediary network device 320 in response to identifying a byte stream having anomalous data complexity may include preventing transmission of the network packet(s) 302 that include the byte stream 304 and/or preventing transmission of future network packets received from the same source device 340 or from a same source identified in the network packet(s) 302.

Figure 4:
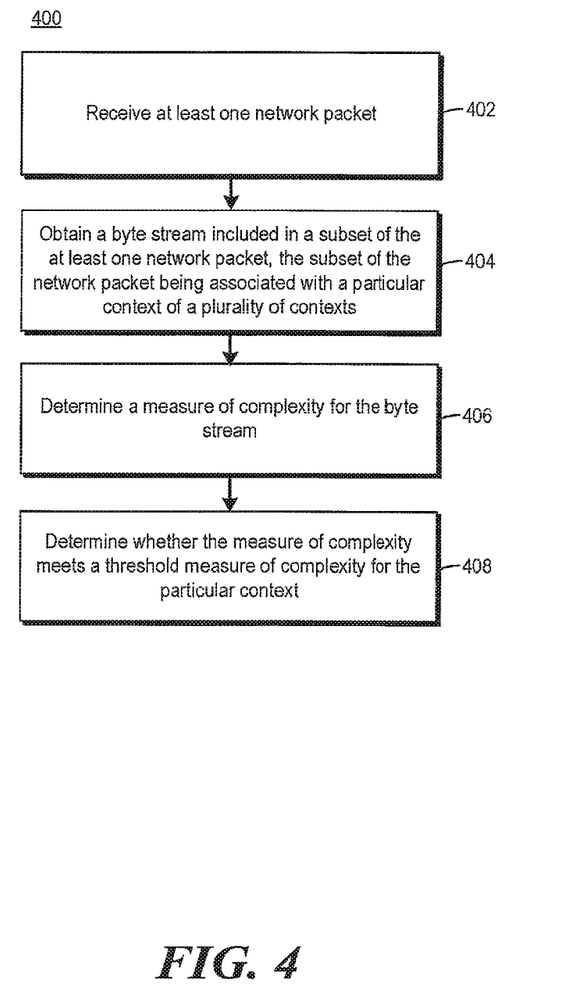
FIG. 4 is a flowchart of an example method for identifying malicious activity using data complexity anomalies.

FIG. 4 is a flowchart of an example method 400 for identifying malicious activity using data complexity anomalies. The method 400 may be performed by a computing device, such as a computing device described in FIG. 1 or 2B. Other computing devices may also be used to execute method 400. Method 400 may be implemented in the form of executable instructions stored on a machine-readable storage medium, such as the storage medium 120, and/or in the form of electronic circuitry, such as a field-programmable gate array (FPGA) and/or an application-specific integrated circuit (ASIC). Combinations of one or more of the foregoing processors may also be used to identify signatures for data sets.

At least one network packet is received (402). For example, a stream of network packets may be received from a computing device. The network packets may be received at a device designed to process the network packets, e.g., by forwarding them to their intended destination, or by a device designed to analyze the network packets, e.g., after transmission.

A byte stream included in a subset of the at least one network packet is obtained, the subset of the network packet being associated with a particular context of a plurality of contexts (404). For example, the byte stream may be a computer file that is included in a particular subset of multiple network packets. The subset of the network packet may be the portion associated with computer file attachments, and the particular context may be computer files, generally.

A measure of complexity is determined for the byte stream (406). For example, the computer file that was included in the network packets may be compressed to obtain a compression ratio. The compression ratio may be the measure of complexity for the computer file.

Whether the measure of complexity meets a threshold measure of complexity for the particular context is determined (408). For example, the compression ratio of the computer file may be compared to a threshold compression ratio for the general computer file context. In some implementations, the threshold measure of complexity for the particular context is based on previously measured compressibility values for at least one other byte stream associated with the particular context. For example, compression ratios of computer files known to be benign may be used to generate a threshold compression ratio for computer files. In situations where the measure of complexity meets the threshold measure of complexity, method 400 may include, for example, providing an indication that the network packet includes anomalous data in response to determining that the measure of complexity meets the threshold. Other actions, such as those described with respect to FIG. 3 above, may also be performed in response to the threshold complexity determination.

The foregoing disclosure describes a number of example implementations for identifying anomalous data complexity. As detailed above, examples provide a mechanism for identifying thresholds for data complexity in various contexts and potential applications of a system that is capable of identifying anomalous data complexity.

We claim:

1. A non-transitory machine-readable storage medium encoded with instructions executable by a hardware processor of a computing device, the machine-readable storage medium comprising instructions to cause the hardware processor to:
receive a byte stream that includes a plurality of bytes;
determine a measure of complexity of the byte stream, the byte stream being associated with a particular context of a plurality of contexts, the particular context being based on a type of information in the byte stream;
select, based on the particular context, a predetermined threshold measure of complexity from among a plurality of predetermined threshold measures of complexity;
compare the measure of complexity to the predetermined threshold measure of complexity to determine whether the byte stream is malicious; and
in response to determining that the measure of complexity meets the predetermined threshold measure of complexity, provide an indication that the byte stream is malicious.

2. The storage medium of claim 1, wherein the hardware processor determines measures of complexity for each of a plurality of proper subsets of the byte stream.

3. The storage medium of claim 1, wherein each the measure of complexity is based on a measure of compressibility.

4. The storage medium of claim 1, wherein the threshold measure of complexity is a distribution threshold.

5. A method for identifying malicious activity using data complexity anomalies, implemented by a hardware processor, the method comprising:
receiving a byte stream,
the byte stream being associated with a particular context of a plurality of contexts, the particular context being based on a type of information in the byte stream;
selecting, based on the particular context, a predetermined threshold measure of complexity from among a plurality of predetermined threshold measures of complexity;
determining a measure of complexity for the byte stream;
comparing the measure of complexity to the predetermined threshold measure of complexity to determine whether the byte stream is malicious; and determining that the byte stream is malicious in response to determining that the measure of complexity meets the predetermined threshold measure of complexity.

\* \* \* \* \*